No. 662,433. Patented Nov. 27, 1900.
H. D. HIBBARD.
FASTENING FOR SAFE OR VAULT PLATES.
(Application filed Mar. 28, 1900.)
(No Model.)

Witnesses:
F. N. Hartland
R. W. Pittman

Inventor,
Henry D. Hibbard,
By his Attorney,
F. H. Richards.

THE NORRIS PETERS CO., PHOTO-LITHO., WASHINGTON, D. C.

UNITED STATES PATENT OFFICE.

HENRY D. HIBBARD, OF PLAINFIELD, NEW JERSEY, ASSIGNOR TO THE HIBBARD-RODMAN-ELY SAFE COMPANY, OF NEW YORK, N. Y.

FASTENING FOR SAFE OR VAULT PLATES.

SPECIFICATION forming part of Letters Patent No. 662,433, dated November 27, 1900.

Application filed March 28, 1900. Serial No. 10,471. (No model.)

*To all whom it may concern:*

Be it known that I, HENRY D. HIBBARD, a citizen of the United States, residing in Plainfield, in the county of Union and State of New Jersey, have invented certain new and useful Improvements in Fastenings for Safe or Vault Plates, of which the following is a specification.

This invention relates to fastenings for safe or vault wall components or plates, one object being to provide an improved fastening for holding together a plurality of wall components or plates of safes or vaults of composite construction—such, for instance, as those shown and described in my three contemporaneously-pending applications filed March 9, 1900, Serial Nos. 7,967, 7,968, and 7,969, respectively.

A further object of the invention is to provide an improved fastening effective to secure safe or vault plates together without the necessity of impairing the integrity of such plates.

A further object of the invention is to provide an improved fastening comprising means shrunk on parts of the safe or vault plates to be fastened together thereby to form a joint under high pressure, so that the faces of contiguous plates forming such joint are brought together with great force, thereby giving a high initial resistance, which must be first overcome before such plates can be separated.

A further object of the invention is to provide an improved safe or vault plate fastening combined with means for locating the plates united by such fastening in fixed position or alinement relatively to each other.

Figure 1:
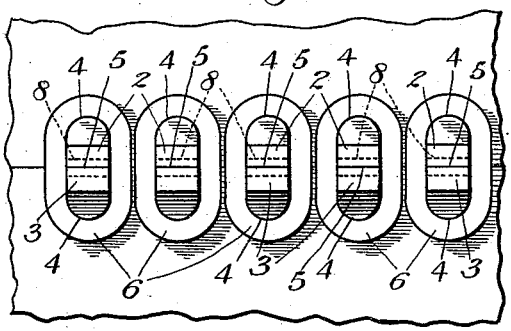
Figure 4:
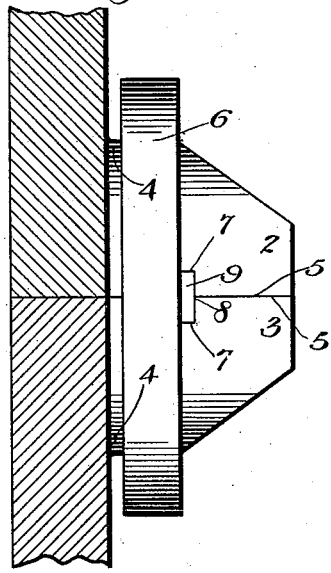
Figure 2:
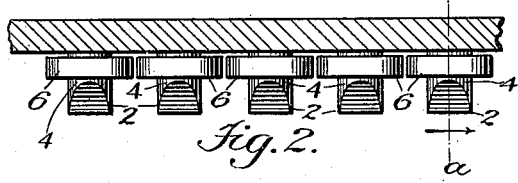
Figure 3:
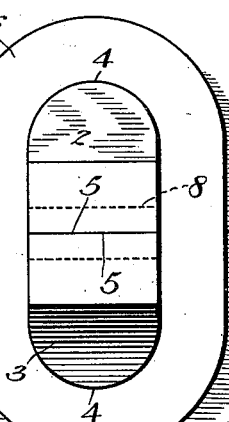
Figure 5:
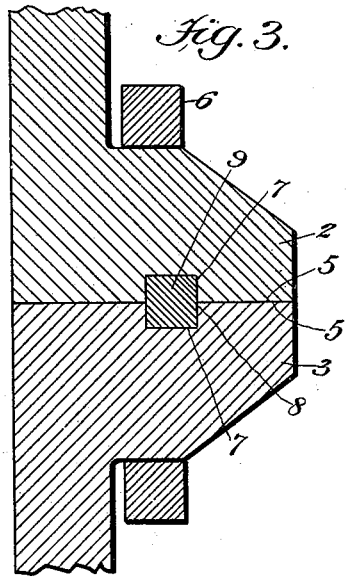

In the drawings accompanying and forming part of this specification, Figure 1 is a view of a series of fastening devices connecting a pair of members or plates. Fig. 2 is a top view of the fastening devices shown in Fig. 1. Fig. 3 is an enlarged sectional view of one of such fastening devices and taken in line *a a*, Fig. 2. Fig. 4 is a side view, on an enlarged scale, of one of such fastening devices with the plates or members united thereby shown in section; and Fig. 5 is a view thereof, looking from the right to the left in Fig. 4.

Similar characters of reference designate like parts in all the figures of the drawings.

In practice any desired number of these improved fastenings may be used, according to the size and character of the members or plates to be united.

In the form thereof herein shown and described, and which may be its preferred form, if desired, this improved fastening comprises a plurality of projections 2 and 3, (shown in the present instance as a pair thereof,) rigid—as, for instance, integral—with the pair of safe or vault members or plates to be secured together, and in the form shown each plate is provided with a projection located at the inner side and adjacent to the edge thereof and in position to register with a companion projection carried by the other member or plate. The projections may be of any desired shape; but in the present instance they are shown as wedge-shaped with rounded exterior surfaces 4 and flat inner faces 5.

To unite the projections together under sufficient tension to resist the opening of the joint, a retaining device is provided, which in the form shown comprises a link 6, shrunk on to said projections, whereby the joints are formed under high pressure—that is to say, the edge faces of the plates or members are drawn together with great force, thereby giving a high initial resistance, which, it will be readily seen, must be first overcome before such members or plates can be separated in the slightest degree to force an entrance into the joint. By this organization it is practicable to make safes, vaults, and strong boxes of highly-resistant material and of a composite construction and which will be for all practical purposes as strong as an integral structure, since the links being shrunk on become to a certain extent integral with the projections. When the plates are large and heavy, it will be seen that by providing a number of these fastenings, located side by side at the desired intervals, it is practically impossible to separate the plates even by the use of high explosives, especially when such plates are formed of "manganese steel," by which is meant the metal produced and treated in accordance with the Hadfield patented processes or other unmachinable metal, since the edges of the plates being drawn together with great force and it being impossible, as is well known, to drill an opening into plates of this character sufficient to permit the insertion of nitroglycerin, it follows that it is not possible in any practicable manner to separate the plates at the joint when connected in the manner specified. Moreover, by means of this improved fastening the necessity of impairing the integrity of the plate for the insertion of bolts or the provision of threads is avoided. Furthermore, by providing the plates with projections in the manner herein described such projections constitute levers the ends of which form a fulcrum, to which levers the link is applied about midway of their length, considering the outer faces of the plates as a part thereof. In this way an effective means is obtained for reducing the tendency of any force applied at the outer side of the plate at the joint thereof to turn the levers within the link and thus permit the joint to open.

For locating the projections and thereby the members or plates rigid therewith in a fixed position or alinement relatively to each other, and thereby prevent the forcing of one plate inwardly independently of its companion plate, means independent of the link is provided, and for this purpose each of the projections is shown provided in its inner face with a recess or slot 7, which when in communication with the recess or slot of its companion projection forms a keyway 8 for the reception of a key 9, by means of which the projections and the members or plates formed as a part thereof may be located in proper alinement and in fixed position relatively to each other, whereby the possibility of forcing one plate inwardly independently of its companion plate is prevented.

By the provision of the present fastening means for securing the plates together it will be seen that the necessity of forming the plates or members of a material which it is possible in a practicable way to drill or work upon with cutting or boring tools is avoided, whereby the plates may be of such a tough character that it is impossible in any practicable manner to drill or work or machine them other than by a grinding action.

The term "plate" as used herein and in the claims is to be interpreted to include when the fastening is used to assemble the various parts of a safe or vault or analogous structure a front or other part of such structure, whether the same is formed as an ordinary flat or curved plate or as a member formed of one or more parts.

Having described my invention, I claim—

1. A safe or vault wall component or plate fastening, comprising, in combination with a plurality of safe or vault plates or wall components set edge to edge, a part or projection rigid with each of said plates and located on the interior of the safe or vault when said plates are assembled in such structure; and means encircling or inclosing said parts or projections for drawing or clamping the edge faces of said plates together with great force thereby to hold said plates under high initial resistance, and which initial resistance must be first overcome before said plates can be separated at the joint formed at such edges.

2. A safe or vault wall component or plate fastening, comprising, in combination with a plurality of safe or vault plates or wall components set edge to edge, a part or projection rigid with each of said plates and located on the interior of the safe or vault when said plates are assembled in such structure; and a coupling device shrunk on to said parts or projections.

3. A safe or vault wall component or plate fastening, comprising, in combination with a plurality of safe or vault plates or wall components set edge to edge, a projection rigid with each of said plates and located on the interior of the safe or vault when said plates are assembled in such structure, and a link shrunk on said projections at a point substantially midway between the outer faces of said plates and the inner ends of said projections.

4. A safe or vault wall component or plate fastening, comprising, in combination with a plurality of safe or vault plates or wall components set edge to edge, a part or projection rigid with each of said plates, and located on the interior of the safe or vault when said plates are assembled in such structure; means encircling or inclosing said parts or projections for drawing or clamping the edge faces of said plates together with great force, thereby to hold said plates under high initial resistance, and which initial resistance must be first overcome before said plates can be separated at the joint formed at such edges; and means for locating said plates in fixed position or alinement relatively to each other.

5. A safe or vault wall component or plate fastening comprising, in combination with a plurality of safe or vault plates or wall components set edge to edge, a projection rigid with each of said plates and located on the interior of the safe or vault when said plates are assembled in such structure; means for locating said plates in fixed position or alinement relatively to each other; and means shrunk on said projections for securing the plates together.

6. A safe or vault wall component or plate fastener, comprising, in combination with a plurality of safe or vault plates or wall components set edge to edge, a projection rigid with each of said plates and located on the interior of the safe or vault when said plates are assembled in such structure, each of said projections having a slot or recess and forming with a recess of a companion projection a keyway; a key located therein; and means encircling or inclosing said projections for securing the plates together.

7. A safe or vault wall component or plate fastening, comprising, in combination with a plurality of safe or vault plates or wall components set edge to edge, a projection rigid with each of said plates and located on the interior of the safe or vault when said plates are assembled in such structure, each of said projections having a slot or recess forming with a recess of a companion projection a keyway; a key located in said keyway; and a link shrunk on said projections at a point substantially midway between the outer faces of said plates and the inner ends of said projections.

8. A safe or vault wall component or plate fastening, comprising, in combination with a plurality of safe or vault plates or wall components set edge to edge, a projection rigid with each of said plates and located on the interior of the safe or vault when said plates are assembled in such structure, said projections having their meeting faces provided with a keyway terminating at the outer, opposite sides of said projections; a key located in said keyway and having its ends substantially flush with the outer, opposite sides of said projections; and means for securing said plates together.

HENRY D. HIBBARD.

Witnesses:
C. A. WEED,
W. S. FANNING.